Sept. 10, 1940.   P. F. SPERRY   2,214,184
REWIND INDICATOR FOR CAMERAS AND THE LIKE
Filed Aug. 27, 1938

Inventor:
Philmore F. Sperry
By Jabel Carlson Gritzbaugh & Wells
Attorneys

Patented Sept. 10, 1940

2,214,184

UNITED STATES PATENT OFFICE 2,214,184

REWIND INDICATOR FOR CAMERAS AND THE LIKE

Philmore F. Sperry, Chicago, Ill., assignor, by mesne assignments, to Revere Camera Company, Chicago, Ill., a corporation of Delaware Application August 27, 1938, Serial No. 227,122

6 Claims. (Cl. 185—44)

My invention relates to moving picture cameras of the type driven by a spring motor and is shown in connection with a camera of this type adapted for use with an 8 mm. film. It is the principal object of my invention to provide an improved form and arrangement of parts by which an effective warning indication shall be given in due time that the spring motor is approaching its run-down condition, such warning to be given well in advance of the actual dissipation of the power of the motor so as to put the operator on guard while at the same time insuring that there shall be sufficient power left in the motor at the time of the warning for continued driving of the camera at the effective speed so as to enable the operator to bring the current series of pictures to a satisfactory stopping point.

For accomplishing my object, I have provided a radially disposed pin resiliently mounted on the wall of the cylindrical housing for the motor spring and arranged so that when the spring spreads out as the tension of the spring is cut down the expanding spring presses the pin outwardly so as to be brought into operative engagement with indicator means comprising a target adapted when actuated by said pin to be flashed temporarily across the line of sight of the finder of the camera. In the preferred arrangement of my improved indicating means, I have organized the warning parts so that such a target shall be seen first in the sighting tube of the finder when there is still a considerable amount of power left in the partially unwound spring and that the target shall appear at least once more in the line of sight of the finder for a repeated warning before the spring becomes so loose as to be appreciably reduced in effectiveness.

It is another object of my invention to improve devices of this type in sundry detail hereinafter pointed out. The preferred means by which I have accomplished my several objects are illustrated in the accompanying drawing and are hereinafter specifically described. In the drawing—

Figure 1:
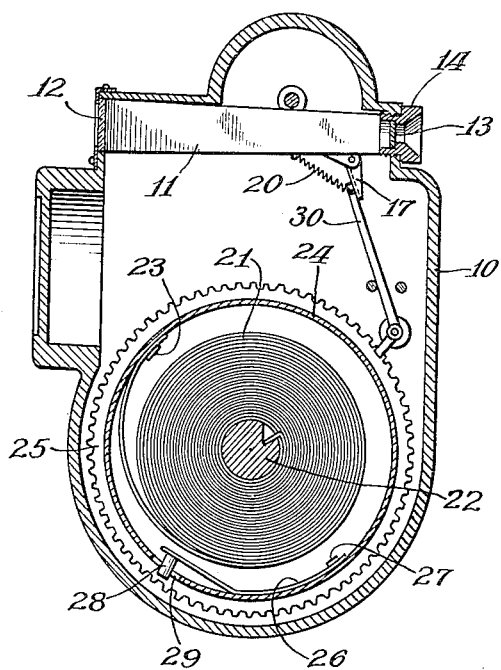
Fig. 1 is a vertical sectional view through a suitable form of camera provided with my improved indicator means, the operating parts of the camera being largely omitted for clearness of illustration.
Figure 2:
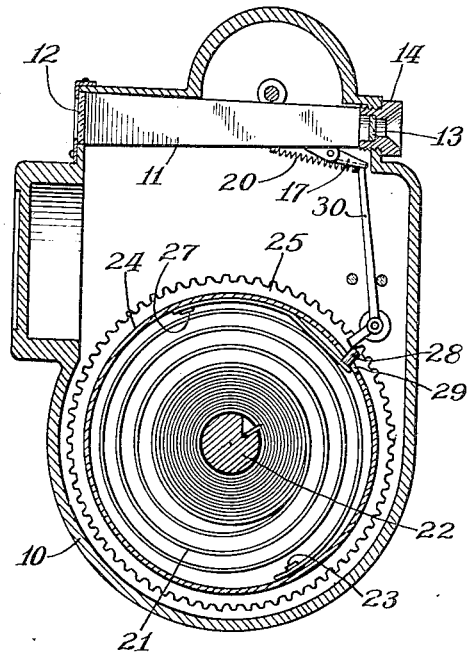
Fig. 2 is a view similar to Fig. 1 but showing a changed position of the parts.
Figure 3:
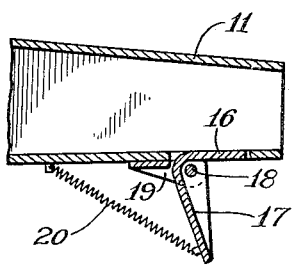
Fig. 3 is an enlarged detailed view of a portion of the parts as shown in Fig. 1 but with additional parts shown in section.
Figure 4:
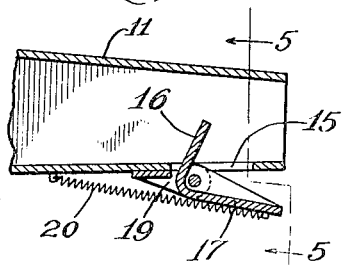
Fig. 4 is a view similar to Fig. 3 but showing a changed position of certain of the parts corresponding to the changed position as shown in Fig. 2.
Figure 5:
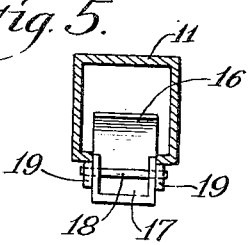
Fig. 5 is a vertical cross sectional view taken substantially at the line 5—5 of Fig. 4.

Referring now to the several figures of the drawing, in which corresponding parts are indicated by the same reference characters, 10 indicates the casing of a camera of any approved type and formed of any suitable material. Near its upper end, the casing 10 is provided with a tubular finder 11, also of any approved type having a lens 12 at the left in Figs. 1 and 2 and a lens 13 and an eyepiece 14 at the right in said figures. As is clearly shown in Figs. 3 and 4, the bottom wall of the tubular finder 11 is provided with an opening 15 therein in which a target 16 is pivotally mounted, such target being in the form of a plate, as is best shown in Fig. 5, with a downwardly extending arm 17 thereon, the arm 17 in the arrangement shown being formed integrally with the plate 16. The plate 16 is pivotally mounted in position by means of a pin 18 extending through lugs 19 depending from the tube 11. The plate 16 is normally held in the position as shown in Fig. 3 so as to close the opening 15, being held in this position by means of a coiled spring 20 connected with the arm 17 and with the tubular member 11 at the left as shown in said Fig. 3. The arrangement is such that when the operator looks through the finder tube 11 toward the left in Figs. 1 and 3, he has a clear vision directly through the finder without interference. When however the parts stand in the position as shown in Figs. 2 and 4, the target 16 partially obstructs the opening through the tube to such an extent as necessarily to be noticed by the operator.

The spring motor for the camera is located within the housing 10 immediately below the finder 11. In the arrangement shown, the motor comprises a coiled flat spring 21 effectively mounted upon a winding arbor 22 of any approved type and having its outer end connected by means of a rivet 23 with the cylindrical wall portion of a housing member 24 rotatably mounted concentrically with the arbor 22. The housing 24 is provided with a gear 25 for applying power from the motor for driving the movable parts of the camera as is well understood by those familiar with the art. The motor is also provided with suitable winding and holding means in connection with the arbor 22 as is usual in arrangements of this type whereby the spring can be wound tightly about the arbor as shown in Fig. 1.

On the inner face of the cylindrical portion of the housing 24 opposite the spring 21, I have provided a mounting arm in the form of a flat spring 26 fixedly mounted in position at one end by means of a rivet 27. Under normal conditions, the spring 26 extends inwardly into slightly spaced relation to the cylindrical wall portion of the spring housing, as is shown in Fig. 1. At the free end of the spring 26, I have provided a radially positioned pin 28 in position to extend through an opening 29 in the wall of the housing.

As is well understood by those familiar with spring motors, as the spring becomes gradually less tense by reason of being partially unwound, the spring spreads within the housing 24 so as to exert a considerable degree of pressure upon the spring 26 for forcing the pin 28 farther and farther outwardly through the opening 29. The arrangement is such that when the spring 21 approaches fairly closely to its run-down condition, the pin 28 is brought into position to engage the short arm of a bellcrank lever 30 pivotally mounted in the casing 10 adjacent to the spring housing 24. Upon the engagement of the pin 28 with the arm of the bellcrank lever 30, with the housing 24 rotating in counter clockwise direction in Fig. 2, the bellcrank lever is swung in clockwise direction from the position as shown in Fig. 1 to the position as shown in Fig. 2, serving by engagement with the arm 17 to swing said arm and the connected target plate 16 from the position as shown in Fig. 3 to the position as shown in Fig. 4, against the action of the spring 20. As soon as the pin 29 has passed the end of the arm of the bellcrank lever 30, the spring 20 serves to bring the arm 17 and the connected plate 16 back to the position as shown in Fig. 3. In the construction shown, the arrangement is such that the pin 28, as it is forced outwardly, rotates with the housing 24 past the bellcrank lever without engaging the lever during the major portion of the driving action of the fully wound spring. When however the spring approaches its fully unwound condition, but before its speed of driving has been substantially reduced, the pin 28 reaches the point in its outward movement such as to cause it to engage the bellcrank lever 30 for giving it an operative stroke as above described. The arrangement further is such that the housing 24 makes at least one more complete rotation at its normal speed of rotation before the driving speed of the spring is appreciably reduced, so that the bellcrank lever 30 and the target plate 16 are given at least two operative strokes by the means comprising the pin 28 and the spring 29 before the effective power of the spring has been dissipated.

As will be readily appreciated, when the target plate 16 is brought into raised position as shown in Fig. 4 during the time when the operator is looking directly through the finder tube 11, the operator cannot fail to notice the movement of the plate into the line of sight so as to be warned effectively as to the approaching end of the effectiveness of the spring. With the spring effective for at least one additional rotation of the housing 24 and gear 25 after the initial warning, the operator is given a considerable leeway in the matter of bringing the series of pictures to a close.

While I prefer to employ the form and arrangement of parts as shown in the drawing and as above described, it is to be understood that my invention is not limited thereto except so far as the claims may be so limited. It is to be understood that changes might well be made in the form and arrangement of the parts without departing from the spirit of my invention.

I claim:

1. In a mechanism of the type described, the combination of a housing, a spring motor mounted in said housing, a rewind indicator, a movable member adapted by a stroke in one direction to actuate said indicator, and means adapted normally to clear said movable member as the motor revolves in fully wound condition and adapted when the tension reaches a predetermined minimum to actuate said movable member and said indicator for giving a warning singal indicating the partially run-down condition of the motor.

2. In a mechanism of the type described, the combination of a spring motor, a housing member about the spring, a pin movably mounted with respect to said housing member in position to be moved outwardly by the spring as the tension of the spring is cut down, a rewind indicator, and means located outwardly beyond the path along which the pin travels when the spring is completely wound up adapted to be engaged by said pin in its changed position when the tension of the spring reaches a predetermined minimum for actuating said rewind indicator.

3. In a mechanism of the type described, the combination of a spring motor comprising a flat coiled spring secured within a rotatably mounted cylindrical housing member so as to rotate said housing member, a pin yieldingly mounted on said housing member so as to be movable radially through an opening in the wall of the cylindrical housing member and positioned so as to be engaged by said coiled spring as its tension decreases and to be moved outwardly by the spring, a rewind indicator, and means actuated by said pin as it rotates with said housing member for giving said rewind indicator an operative actuation when the tension of the spring reaches a predetermined minimum.

4. In a mechanism of the type described, the combination of a spring motor comprising a flat coiled spring secured within a rotatably mounted cylindrical housing member so as to rotate said housing member, a flat spring secured to the inner face of the cylindrical wall of said housing member and extending at one end into slightly spaced relation to said wall in position to be forced outwardly by said coiled spring when its tension is cut down to a predetermined minimum, a radially disposed pin on said flat spring in position to be projected outwardly through an opening in the cylindrical wall of the housing member, a rewind indicator, and means actuated by said pin as it rotates with said housing member for giving said rewind indicator an operative actuation when the pin stands in its outwardly projected position.

5. In a mechanism of the type described, the combination of a spring motor, a housing member about the spring, an arm mounted in said housing and normally held in spaced relation to the wall of the housing but adapted to be forced outwardly by engagement with the spring as the tension of the spring is reduced so as to cause the spring to spread out in the housing, a radially positioned pin carried by said arm in position to be projected outwardly through an opening in the wall of the housing as the spring becomes unwound, a rewind indicator, and means actuated by said pin for giving said rewind indicator an operative actuation when the pin stands in its outwardly projected position.

6. In a mechanism of the type described, the combination of a spring motor, a housing member about the spring, a pin yieldingly mounted in said housing member so as to be movable radially through an opening in the wall of the housing and adapted to be forced outwardly by engagement with said spring as the tension of the spring is reduced, a target pivotally mounted adjacent to said housing, an actuating member movably mounted in position adjacent to said target for moving the target about its pivotal axis, and means adapted by engagement with said pin in its projecting position to give said actuating member an operative stroke for moving said target.

PHILMORE F. SPERRY.